US010631531B2

(12) United States Patent
Engelbrecht et al.

(10) Patent No.: US 10,631,531 B2
(45) Date of Patent: Apr. 28, 2020

(54) SPRAYER FLUID OPERATION SYSTEM

(71) Applicant: Deere & Company

(72) Inventors: Joshua J. Engelbrecht, Venray (NL); Martijn Van Gils, Oeffelt (NL)

(73) Assignee: Deere & Company, Moline, IL (US)

( * ) Notice: Subject to any disclaimer, the term of this patent is extended or adjusted under 35 U.S.C. 154(b) by 98 days.

(21) Appl. No.: 14/934,736

(22) Filed: Nov. 6, 2015

(65) Prior Publication Data

US 2017/0006852 A1    Jan. 12, 2017

Related U.S. Application Data

(60) Provisional application No. 62/189,017, filed on Jul. 6, 2015.

(51) Int. Cl.
*A01M 7/00* (2006.01)
*B05B 9/04* (2006.01)

(52) U.S. Cl.
CPC ........ *A01M 7/0042* (2013.01); *A01M 7/0053* (2013.01); *A01M 7/0082* (2013.01); *A01M 7/0089* (2013.01); *B05B 9/0406* (2013.01); *B05B 9/0423* (2013.01)

(58) Field of Classification Search
CPC .............. A01M 7/0042; A01M 7/0053; A01M 7/0082; A01M 7/0089; A01M 7/0092; A01C 23/042; B05B 9/0423; B05B 9/0403; B05B 9/0406
USPC ................. 239/124–127, 142, 146, 159–170
See application file for complete search history.

(56) References Cited

U.S. PATENT DOCUMENTS

| | | | | |
|---|---|---|---|---|
| 4,373,669 A * | 2/1983 | Swanson | ............. | A01M 7/0089 239/124 |
| 4,638,924 A * | 1/1987 | Newsom | ............. | A01C 23/042 137/106 |
| 5,190,218 A * | 3/1993 | Kayser | ................ | A01M 7/0042 239/142 |
| 7,845,914 B2 * | 12/2010 | Engelbrecht | ........ | A01M 7/0089 137/565.29 |

* cited by examiner

*Primary Examiner* — Alex M Valvis

(57) ABSTRACT

Embodiments of a spray fluid operation system include a fluid flow circuit that provides several sprayer features while using a minimum number of fluid pumps. In an agricultural setting, a first pump (one function of which is filling) is integrated with a second pump (one function of which is spraying) and both located compactly underneath the solution tank. In some embodiments that include only two pumps, they are centrifugal impeller pumps. Each of the two pumps is capable of performing more than one function. Together, they provide self-primed filling, auto dilution, eductor rinsing, and so on, in a fluid-isolated manner to avoid fluid contamination.

14 Claims, 7 Drawing Sheets

SPRAYER FLUID OPERATION SYSTEM

RELATED APPLICATIONS

This disclosure relates generally to fluid operation systems such as used in agricultural sprayers. This patent application also claims priority to U.S. Provisional Patent Application Ser. No. 62/189,017, filed Jul. 6, 2015, and entitled, SPRAYER FLUID OPERATION SYSTEM, the contents of which are incorporated herein by reference.

FIELD

This disclosure relates generally to fluid operation systems such as used in agricultural sprayers.

BACKGROUND

Large system sprayers apply nutrients, herbicides, paints, chemicals and other liquids such as those used on agricultural crops or industrial surfaces. Due to the large amounts of fluid and different fluid solutions involved, the control pumps for fluid filling, cleansing, mixing, agitating, spraying and pressurizing are very complicated, bulky, heavy and expensive. Further, different countries may have different regulations as to the type of fluids and concentration levels.

SUMMARY OF THE DISCLOSURE

Various aspects of example embodiments are set out below and in the claims. One embodiment includes a sprayer system having a spray fluid operation system that includes a fluid flow circuit to provide multiple spray features while using a minimum number of fluid pumps. In an agricultural setting, a first pump (one function of which is filling) is integrated with a second pump (one function of which is spraying) and both are located compactly underneath a solution tank. One embodiment has only two pumps that are centrifugal impeller pumps. Each of the two pumps is capable of performing more than one function. Together, they provide self-primed filling, auto dilution, eductor rinsing, and so on, in a fluid-isolated manner to avoid fluid contamination.

BRIEF DESCRIPTION OF THE DRAWINGS

The detailed description refers to the following example figures.

DETAILED DESCRIPTION

Figure 1:
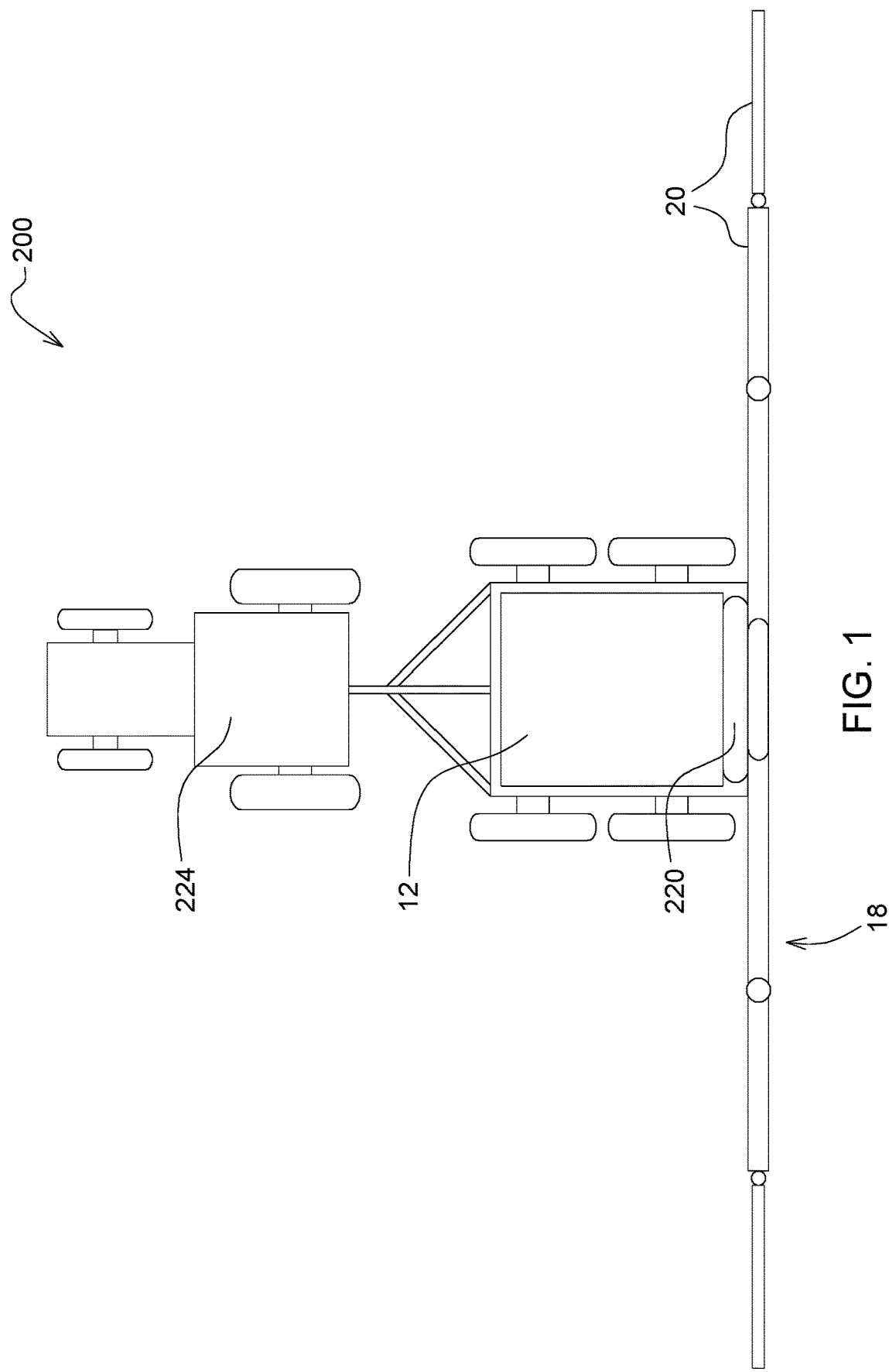
FIG. 1 depicts a top view of an example vehicle towing a spray applicator vehicle.

This disclosure provides example embodiments of trailed sprayers having an integrated fluid operation system that provides two strategically located together, integrated pumps (e.g. centrifugal impeller pumps) that can perform fast, or even simultaneous fluid operations such as tank filling along with rinsing, spraying, diluting, or agitating. Each of the pumps is capable of performing more than one function so that both pumps either perform the same or different functions simultaneously. For example, the filling speed can be increased when both pumps perform simultaneous filling of a single solution tank. In some embodiments, instead of two separate pumps each with its own hydraulic or electronic regulators, there is a shared mechanism. Alternatively, when each pump simultaneously performs a different function such as filling and rinsing, one pump is directly connected to the solution tank, while the other pump is directly connected to the rinse tank. By enabling the capability of rinsing (or spraying or auto-diluting) and filling, simultaneously, this greatly increases the speed of the fluid operations. There are additional operations such as auto dilution or continuous dilution in the solution tank to preserve the proper concentration of different fluids, a practice which complies with regulations or which helps the direct injection of chemicals. Further, multiples valves are added to the outlets of the pumps in order to enable remote control of the pump system or to enable a particular pump to switch among multiple functions such as to stop/start filling, spraying or auto-diluting, auxiliary cleaning or eductor rinsing.

Although there are two pumps, and the fluid operations circuits are separated by valves so that with certain valves closed, the fluid circuits for each pump can be fully separated (or fluid isolated). This prevents fluid cross contamination. Careful allocation of the pump capabilities improves system performance by careful division of responsibilities between the circuits. In some embodiments, none of the functions are duplicated among the two pumps. In other embodiments some of the functions are actually duplicated to increase the speed of performing that function.

Due to the strategic location of the pumps and each pump able to perform more than one function, the overall real estate taken up by the new fluid operation system is much smaller than before (by over 50% smaller). Since the new fluid operation system is smaller, it can fit underneath a small portion of the main solution tank. This eliminates locating part of the formerly bulky operation system adjacent to the applicator vehicle and wheels—which has been the industry practice. The new smaller system reduces the weight of the applicator vehicle and allows an operator to have more direct line of sight to the rear of the sprayer vehicle and to the field. Although the illustrations and description in this Disclosure focuses on trailed sprayers where the vehicle (e.g. tractor) tows a solution tank mounted on a platform with wheels, self-propelled sprayers may also benefit from the disclosed concepts. Other industries that utilize spraying systems (e.g. cleaning, painting) can also benefit.

FIG. 1 depicts an example sprayer system 200 such as for spraying crops in a field. A vehicle 224 such as tractor either has an attached or tows a solution tank 12 that is mounted on an applicator platform 226 having wheels 228. A spray boom 18 is located at the rear of the solution tank 12. Spray nozzles 22 are mounted to a sectioned fluid pipe that is attached to the articulated spray boom 18 (spray boom sections 20).

Figure 2:
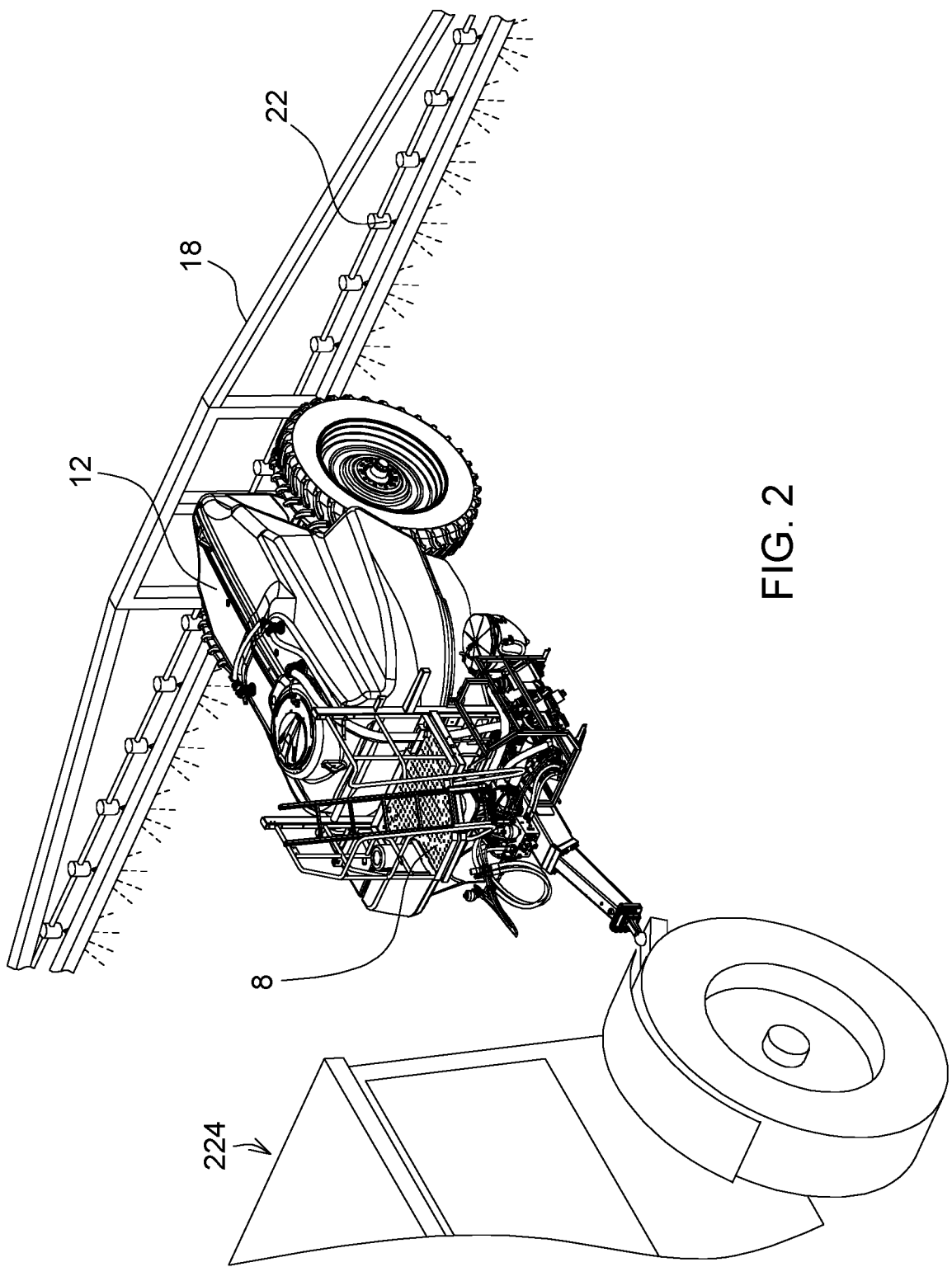
FIG. 2 depicts a perspective view of an example vehicle towing a spray applicator vehicle.

FIG. 2 depicts a perspective view of an example vehicle 224 hitched to a spray applicator vehicle with a solution tank 12 mounted on two wheels. The solution tank 12 is integrated with a spray applicator that is located ahead of and partly under the front of the solution tank 12.

Figure 3:
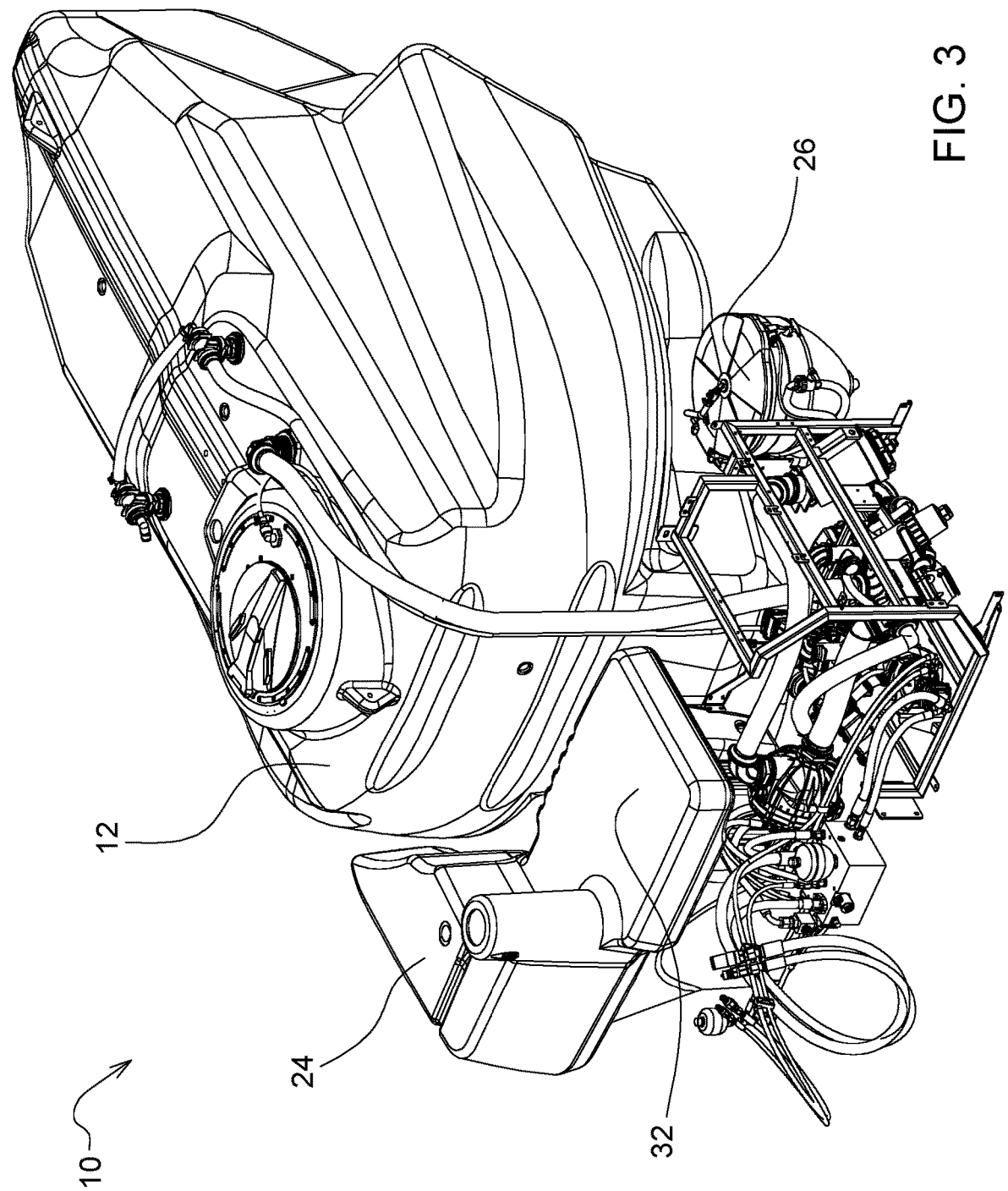
FIG. 3 depicts a close up view of the example fluid operation system of FIG. 2.
Figure 3A:
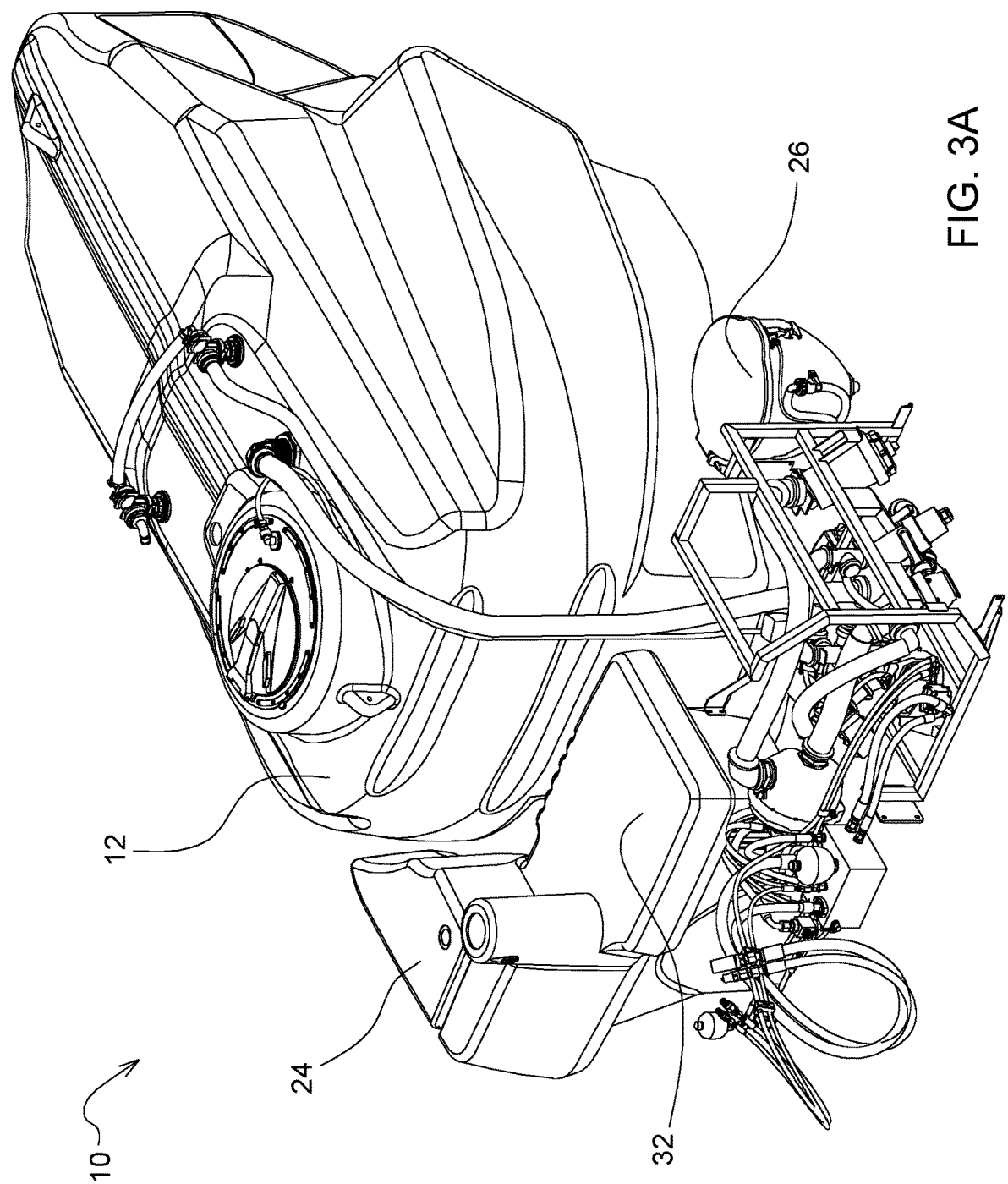
FIG. 3A depicts a line drawing of the example fluid operation system of FIG. 3.

FIG. 3 depicts a close up view of the example fluid operation system (application system) 10 of FIG. 2. The visibly prominent features include the solution tank 12, rinse tank 24 and the eductor tank 26. Solution tank 12 carries the fluid (e.g. water) and chemicals that are sprayed on a large agricultural field (e.g. over 500 acres). Because a filled solution tank 12 is heavy, it causes soil compaction or crop damage so that a smaller and more light-weight hydraulic system 150 is appreciated by farmers. But with a compact, co-located (integrated in one location) hydraulic system that is underneath and thus protected by the solution tank 12, there is no longer a need for a shield covering or cover housing, which reduces the weight. With compact-sized hydraulics, there is also no need to split up the hydraulics system 150 and mount part of it on some other part of the fluid operation system (application system) 10. For example, in FIG. 3, all the hoses, valves, controller and pumps fit directly underneath system 10, or directly underneath in the front of system 10. For example, the pumps are located within 1 meter from one another for a solution tank 12 or fluid operation system 10 that is about 3 meters wide. The rinse tank 24 has an extended ledge 32, under which the hydraulics system 150 is located. In the example of FIG. 2, there is a cover 8 above the ledge 32 that further protects the hydraulics system 150. In other embodiments, the solution tank 12 is re-shaped (e.g. flatter but longer) so that all the hydraulics system 150 can fit underneath the solution tank 12. In these embodiments, all the hydraulics system 150 is co-located rather than split up on different parts of the fluid operation system 10 (e.g. under and on the side of system 10). Example solution tanks 12 hold about 6000-6500 liters, and rinse tanks 24 about 600-650 liters. In an industrial application, the solution tank 12 may be smaller and may carry paint, oil or other industrial fluids. On the other hand, cleaning tanks such as to clean cargo ships and ocean liners may be bigger than the tanks for agriculture. FIG. 3A depicts a line drawing of the example fluid operation system of FIG. 3.

Figure 4:
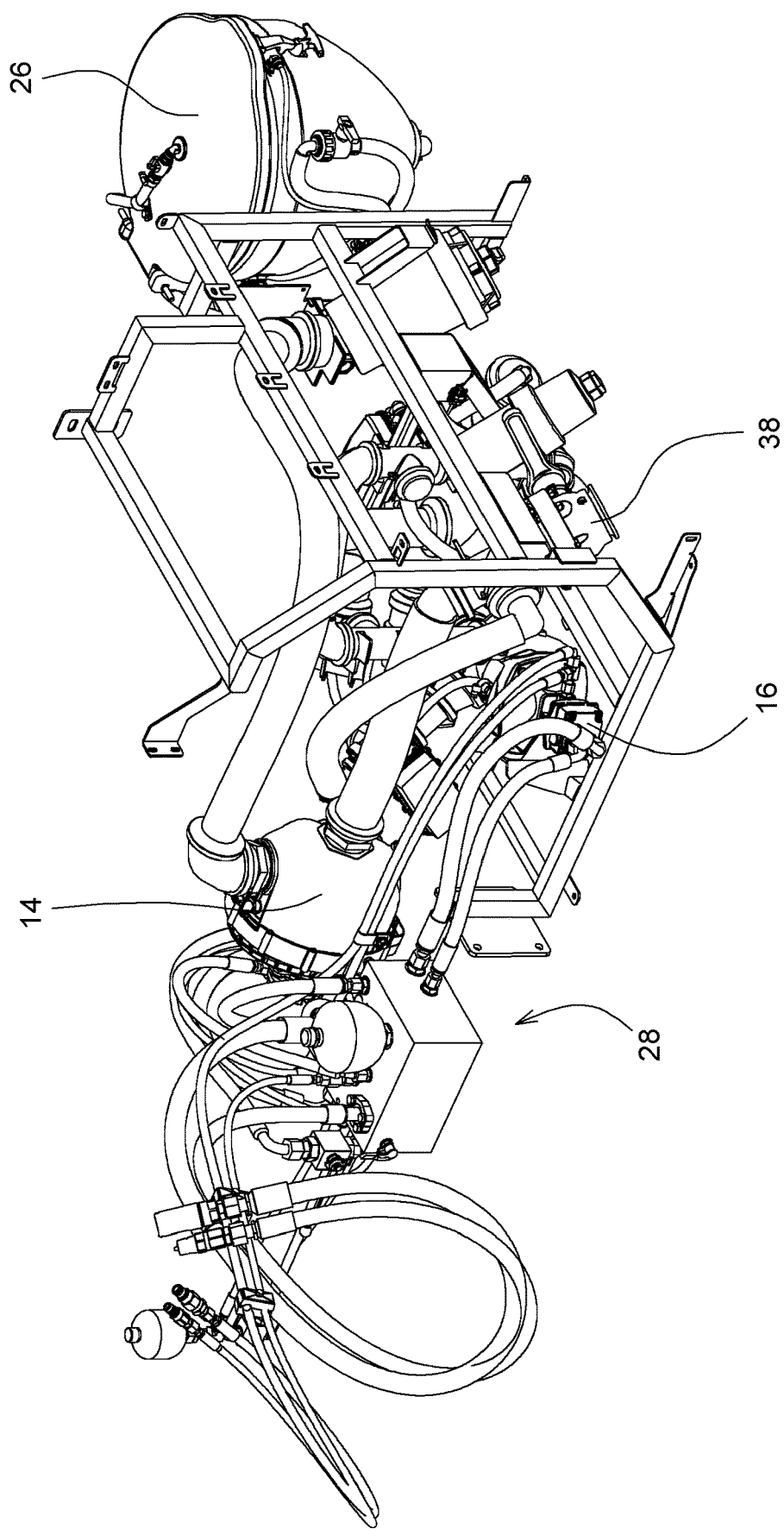
FIG. 4 depicts a close up view of part of the fluid operation system of FIG. 3.

FIG. 4 depicts a close up view of the hydraulics system 150 and electronics part of the fluid operation system 10 of FIG. 3. Various valves, strainers and two pumps are labeled to indicate where the fluid flows. Depending on the desired pressure for releasing the spray fluid, the spray pump (e.g. 16) may operate at lower rates such as at 40 liters per minute. By contrast, the example pump for filling may use only 40 to 50 liters per minute of oil. The space occupied by the hydraulics system 150 is less than half of a typical system. The metallic frame usually brackets a densely-packed hydraulic system 150 that would protrude past the frame. But as shown in FIG. 3, the amount of hydraulics system 150 is small and there is plenty of empty space remaining within the metallic frame assembly. Further, the hydraulics system 150 in competitor systems is divided up. But with the example embodiments disclosed herein, there is now no additional spray fluid hydraulics that would have been separately mounted near the wheels and tires of the spray applicator vehicle, as they are in competitor or past systems. To cover the former, separate spray hydraulics near the wheel, there normally would have been a heavy protective shield that is now no longer needed in the example new hydraulic system 150 shown in FIGS. 3, 3A and 4. The new hydraulic system 150 fits neatly underneath the solution tank 12 and rinse tank 24 with space left over to install additional electronics and modules (e.g. cartridges) containing chemicals that could be mixed into the solution tank 12 or a split solution tank for direct injection practices.

Figure 5:
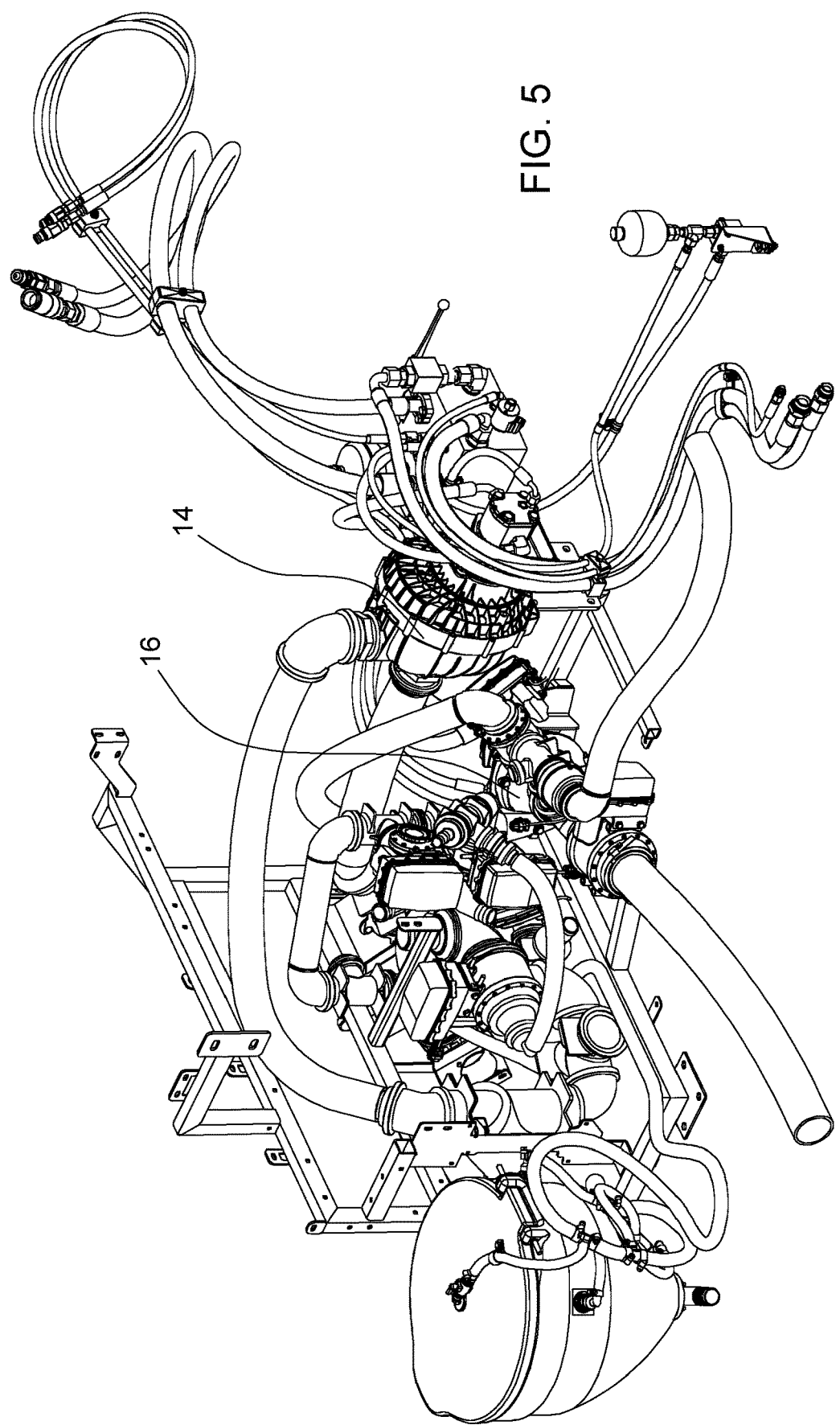
FIG. 5 depicts another perspective view of the part of the fluid operation system of FIG. 4.

FIG. 5 depicts another perspective view of the part of the fluid operation system 10 of FIG. 4. Various valves and the two pumps are labeled to indicate where the fluid flow enters and exits.

Figure 6:
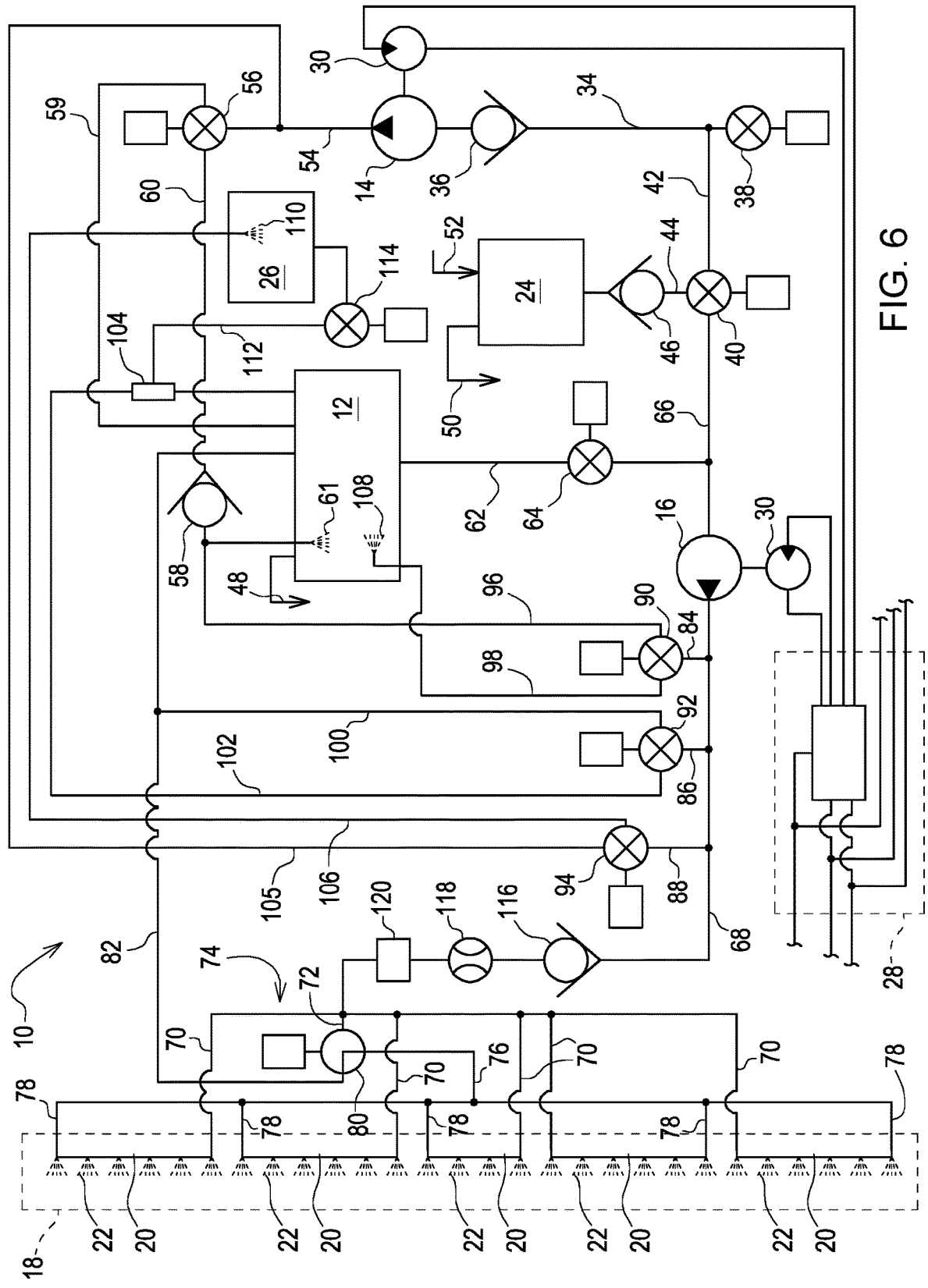
FIG. 6 depicts a fluid schematic of an example fluid operation system that may be embodied by the spray applicator of FIG. 3.

FIG. 6 depicts a fluid schematic of an example fluid operation system 10 that may be embodied by the spray applicator of FIG. 3. System 10 includes a solution tank 12 for storing field spray fluids, a first pump 14 for filling the solution tank 12, or for rinsing and cleaning of a first portion of the fluid operation system 10 and for diluting the spray solution in the solution tank 12, a second pump 16 (e.g. spray pump or rinse pump) adapted for dispensing the spray solution, for circulating, recirculating or agitating the spray solution in the solution tank 12 as well as for flushing (rinsing) and cleaning a second part of the fluid operation system 10.

In the example embodiment of FIG. 6, the first pump 14 (two functions of which are fill or rinse) is a self-priming centrifugal impeller pump with a relatively high flow volume at a relatively low delivery pressure. The second pump 16 (two functions of which are spray or rinse) is a non-self-priming centrifugal impeller pump. After much experimentation with previous designs, this combination of centrifugal pumps was found to work well using reasonably priced, available off-the-shelf industrial pumps. In a spray function, the pressure to deliver the spray fluid, especially, in a long spray boom 18 is varied during operation such that the maximum pressure, maximum flow and priming are not readily available in the pump industry. Available self priming pumps are geared towards lower pressures that are usually insufficient for moving fluid at high flow rates, which is often needed for fluid distribution pipes ("plumbing") for spray booms 18 longer than 25 meters and mounted on vehicles traveling faster than about 15 miles per hour. Furthermore, self priming pumps maintain some fluid in an internal reservoir even when the pump stops pumping. The residual fluid may alter the desired chemical composition of the solution, which may not be good for spraying purposes. So the second pump 16 is non-self priming and can be used for spraying, circulating, recirculating, diluting, mixing, agitating or rinsing functions. In some embodiments, if the second pump 16 has access to suction capabilities (e.g. with an added suction device), it can also perform tank filling operations. On the other hand, a self priming pump frees itself of air when it becomes air-bound, and will resume pumping without attention so that it is usually easier to operate and maintain. So the first centrifugal pump 14 is self priming and pump 14 can function as a fill, rinse, mixing, re-circulate, suction or agitator pump. If the first pump 14 is used continuously with water, it can also be used for diluting the solution in the solution tank 12.

In addition, the example fluid operation system 10 includes a spray boom 18 with multiple boom sections 20 on which spray nozzles 22 are arranged (only ever one spray boom section 20 is provided here with reference numerals). The fluid operation system 10 further includes a rinse tank 24 for cleansing the tanks and flow lines, and an eductor tank 26 for absorbing or separating fluids from a crop field or chemical application (e.g, spray herbicides, pesticides, insecticides, fertilizers or other chemicals).

The two pumps 14, 16 are together hydraulically driven by the hydraulic flow regulator 28, and also by their respective local hydraulic motors or local control units. The first pump 14 is also driven by its local hydraulic motor or control unit 30; the second pump 16 by its local hydraulic motor or control unit 30.

The first pump 14 has an input side connected to a filling line 34, along which there is an opening to a non-return or one-way valve 36. The filling line 34 is further equipped with a filling valve 38, which can be connected for filling the fluid operation system 10 with an application carrier liquid to an external tank (not shown). In the schematic of FIG. 6, the first pump 14 is coupled to the solution tank 12 via valves 56 and 58 so that pump 14 can fill the solution tank 12.

The filling line 34 is further coupled to a controllable path (line 42), then to a 3-way valve 40, which in turn is coupled to the rinse tank 24 that is connected to a fresh water line 52. Between the valve 40 and the rinse tank 24, there is a supply line 44 that is provided with a valve 40 for opening a non-return valve 46. Filling the rinse tank 24 can be effected via a filling from filling inlet 38 or line 42 or fresh water line 52, any of which may actually provide fresh water or other solutions to rinse out the entire fluid path or circuit path of system 10. Each of the solution tank 12 and the rinse tank 24 also has a vent line 48 or 50.

On the output side, the first pump 14 is couple to a filling line 54, which leads into the solution tank 12, where the filling line 54 includes a controllable 3-way valve 56. Filling line 54 also leads to valve 94 so that the first pump 14 may also release fluid to the plumbing and spray nozzles 22 such as for calibrating, testing, cleansing or rinsing. Otherwise, filling line 54 leads to valve 56, then purge line 60 and then to check valve 58 and then into the solution tank 12. At the opening into the solution tank 12, there is a nozzle head 61.

The second pump 16 receives input fluid from the solution tank 12, via a feed line 62. Pump 16 and the feed line 62 are arranged in relation to the solution tank 12 and positioned in such a way that liquid from the solution tank 12 flows downward to the second pump 16 with the aid of gravitational force. This is one reason why the hydraulic system is located below the solution tank 12. The second pump 16 is the one that pumps fluid for spraying so that the gravitational force helps reduce the amount of work to pump the fluid out of the spray nozzles 22. In order to stop the fluid flow to pump 16, the feed line 62 contains a controllable shut-off valve 64.

The second pump 16 may also receive fluid from the rinse tank 24. Fluid moves from the rinse tank 24 to valve 40 then to purge line 66 and then to the second pump 16. In some embodiments, fluid from the rinse tank 24 can also go to the solution tank 12 to clean tank 12 or to dilute the contents of the solution tank 12. Since the rinse tank 24 is located mostly below the solution tank 12, the second pump 16 helps to push the liquid from the rinse tank 24 to the solution tank 12 via conduit 98.

The output side of the second pump 16 extends to an exhaust duct 68, which eventually connects to respective branch lines 70 on each boom section 20 of spray boom 18 and via a connecting line 72 to a recirculation device 74. The recirculation device 74 includes a first line 76 with several branches 78 at their outlet ports that are connected to the individual boom sections 20 of spray boom 18. The recirculation device 74 further includes a controllable three-way valve 80 that couples to the connecting line 72 and connecting lines 72 and 76. The three-way valve 80 also couples to a second recirculation line 82 which opens into the solution tank 12 so that there are multiple pathways between the solution tank 12 and the spray nozzles 22, which is useful for test, calibration, quality checks, dilution, fluid re-use, fluid savings, along with the normal spray operation.

The output side of the second pump 16 also branches off from the exhaust duct 68 to a first branch line 84, a second branch line 86 and a third branch line 88. The branch lines 84, 86, 88 each opens into a controllable three-way valve 90, 92, 94, respectively. The first branch associated with valve 90 is used for purge line 96 or for fluid recirculation via conduit 98. The purge line 96 extends from the purge line 60 between the solution tank 12 and check valve 58; purge line 96 ends at valve and branch line 84. The circulating line 98 starts from the valve 84 to a lower portion of the solution tank 12 where there is a nozzle head 108. The second branch line 86 associated with valve 92 is a return line 100 or a connection to a venturi pipe return line 102. Valves 90 and 92 also aid in the recirculation or circulation of the fluid in order to agitate the fluid. The third branch line 88 associated with valve 94 is connected to a first rinse or purge line 105 or to a second purge line 106.

The return line 100 extends from the valve 92; return line 100 is connected to the recirculation line 82 of the recirculation device 74; recirculation line 82 further leads to the solution tank 12. The venturi pipe return line 102 starts from the valve 92 through a venturi device 104 (e.g. venturi constriction) into the solution tank 12.

The purge line 105 branches from filling line 54 from the first pump 14; the purge line 105 is also connecting valve 94 and valve 56. Valve 94 is also connected to a purge line 106 that leads to a nozzle head 110 in the eductor tank 26. Between the eductor tank 26 and venturi device 104 is a suction line 112, which can be opened or closed via a switchable shut-off valve 114.

The example recirculation device 74 opens in the direction of the recirculation check valve 116, where a flow meter 118 and a pressure sensor 120 are located in the exhaust duct 68. Exhaust duct 68 branches from lines 88 and 86 before the recirculation.

An electronic control unit (not shown) is electrically coupled to (wired or wireless) the valves 40, 56, 64, 80 (e.g. three-way), 90, 92, 94 and 114 and automatically controls the fluid operation system 10 according to the instructions of an operator. The electronic control unit is located on the central computer panel in the cab or on a remote part of the farm site for agricultural applications.

The operation of the spray system 10 includes multiple functions, which can be controlled or implemented by the electronic control unit. The functions are performed with increased speed. With both pumps 14 and 16 being capable of performing multiple functions each, there may be simultaneous completion of tasks that would normally be carried out sequentially by one of the pumps. For example, if rinse water needs to be added, this can be performed while spraying is occurring. In addition, not all functions need high pressure—e.g. the spraying function uses a high enough pressure to push the fluid through a long spray boom 18 and 90 to 130 spray nozzles 22. As such, in some embodiments, it is possible to design a pump optimized for high flow and priming without having to compromise by moving the needed pressure to the other pump.

An example method of filling the solution tank 12 includes connecting the filling valve or inlet 38 to a liquid tank or other fluid source by a pumping action of the first pump 14 until solution tank 12 is filled with the application or spray carrier fluid. Some embodiments include filling from public water systems such as a fire hydrant or park reservoir facility. For some regions (e.g. Europe), using public water system for filling, the filling connection is regulated by an administrative standard to protect the water system from backflow. Rather than using the traditional separate filling connections and valves, the example embodiment of FIG. 6 combines filling with the first pump 14 and regulated public filling into one filling connection. A vacuum break hose is installed on line 59 at the top of the solution tank 12 to satisfy the regulations while using the first pump 14 with a public water system.

An example method of supplying chemical applications (spraying), recirculation and removal of carrier fluid (solution) may be effected via the feed line 62 by opening the valve 64. The liquid in the solution tank 12 flows down to the non-self-priming second pump 16 and directly fills pump 16 with liquid. The second pump 16 is located beneath the solution tank 12 so that liquid can flow by gravity into the pump 16 without applying suction. In some embodiments, when liquid leaves solution tank 12 to pump 16, a chain reaction causes a negative pressure on the suction line 112 such that when valve 114 is open, suction of liquids from the eductor tank 26 begins. That is, as fluid leaves the solution tank 12, the valve 92 may be closed along the venturi pipe return line 102 and the pressure differential is generated in the venturi device 104 in a way to effect the suction of liquids from the eductor tank 26. Meanwhile, the fluid flow from solution tank 12 may also be used for spraying (fluid travels to exhaust duct 68 and out to the spray boom 18 and nozzles 22) or for recirculation (fluid travels to recirculation device 74 then to line 82 or fluid travels to branch line 84 then to back to the solution tank 12 when the appropriate valves along that path is open). The recirculation can serve to warm the fluid or to mix the fluid more uniformly or to adjust the amount of pressure and fluid going to the plumbing and spray nozzles 22.

In some embodiments, the eductor tank 26 is a small hopper of about 35-55 liters such as in FIG. 3. An operator uses the hopper to load crop protection fluids into the sprayer solution tank 12. Liquids and powders are poured into that small hopper. There are inlet nozzles on the side of the tank 26 to help mix concentrated crop protection fluids with some water. The venturi device 104 on top of the solution tank 12 sucks the hopper contents into tank 12. This allows the operator to mix and load the crop protection fluid into the solution tank 12 without carrying it up on the platform. There is also a nozzle head 110 to allow rinsing of the eductor tank 26.

When field spraying is desired without the parallel occurrence of fluid recirculation, valve 80 is closed off in the direction of the recirculation line. Fluid instead travels to line 70 and then to boom 18 and spray nozzles 22. The feeding of fluid from the eductor tank 26 can be optionally interrupted by closing the valve 92 in the direction of the venturi pipe return line 102 and/or by closing the valve 114. The latter causes may cause a suction pressure on the suction line 112, but no liquid can be sucked from the eductor tank 26. In some embodiments, by opening the valve 92 in the direction of the return line 100 another recirculation function is effected without the fluid flowing through the spray boom 18. Once the desired amount of fluid is fed to spray the field, the valve 92 may be also closed so that no fluid goes to the venturi and/or return lines 102 and 100. Optionally while the fluid is released to spray the field, the valve 92 can remain open to the return line 82 so that increased circulation of the liquid occurs in parallel to the solution tank 12 by an additional return of fluid.

An example of circulating the fluid in the solution tank 12 includes the following. Apart from the recirculation function described above, there is line 98 that pumps fluid to the solution tank 12 by using liquid recycled from opening valve 90 to line 98 towards the direction of the solution tank 12. This is a primary method of circulating the fluid near the lower region of the solution tank 12. This prevents chemicals from precipitating from the solution and causing sedimentation. For circulating the rest of the fluid in the solution tank 12, valve 90 is opened in the direction of the purge line 96 fluid to release fluid into the upper region of the solution tank 12, such as for rinsing or cleaning of the tank 12.

An example method of cleaning the fluid operation system 10 includes flushing (rinsing) all the hydraulics system 150 or only part of it since all the paths are interconnected and an operator may open any of the valves. This is even true out to the spray nozzles 22: either the section valves in the plumbing may be opened or closed, or the valves in individual spray nozzles 22 can be opened or closed (e.g. through pulse width modulated valves within a nozzle). As for the rest of the fluid operation system 10, for example, via the valve 40, the pumps 14 and 16 are connected to the rinse tank 24 and to fresh water lines for cleaning the system 10. The second pump 16 can pump fresh water or cleaning solution through the exhaust duct 68 and the associated three-way valves 80 into the lines 70, 76, 78 (branch), 82, 84, 86, 88, 96, 98, 100, 102, 105, and 106. Simultaneously or at another time, the first pump 14 can pump cleanser through line 54 and valve 56 to purge lines 60, 59, and 105 and so on. Further, the purge line 105 is connected to line 106 for flushing the eductor tank 26 via the valve 94, which cleans the eductor tank 26 and flushes the valve 114, the venturi device 104, the venturi pipe return line 102 and the purge line 106. When cleaning the spray nozzles 22 and plumbing, the check valve 58 can be used to prevent contamination of the purge line 60. In the event that a premixed solution is pre-loaded and in use during filling of the solution tank 12, the first pump 14 (filling pump) may be used independently from the rest of the fluid operation system 10 that is being cleaned or flushed by the second pump 16 and the corresponding connection to the rinse tank 24. In other embodiments, the first pump 14 can be used to divert part of the fluid to flush part of the system 10 while helping to fill the solution tank 12.

Another aspect of the example method of cleaning the fluid operation system 10 includes using filling the solution tank 12 while rinsing the eductor tank 26 with clean water. Simultaneous action saves time, but the eductor tank rinsing usually completes before the solution tank 12 is full so that solution filling pauses. Since the first pump 14 is a centrifugal pump, the filling can be readily paused, while still providing the clean filling water to the eductor tank 26 and using the second pump 16 to power the eductor tank's venturi connection. When the filling is paused, the time may be used to more thoroughly mix the chemicals in the eductor tank 26. Alternatively, since the filling speed is so high with the disclosed embodiments, the operator loses very little time with pausing the solution filling.

An example method of diluting the liquid in the solution tank 12 includes opening the valve (filling inlet 38) in the direction of the first pump 14 and by opening the valve 56 in the direction of the purge line 60 into the solution tank 12. Fresh water is usually used to dilute the fluid in the solution tank 12. Optionally, there is a simultaneous spray operation occurring while the diluting or auto-diluting is taking place because while fluid is filling solution tank 12, tank 12 can also release fluid to the second pump 16. As another option, the dilution or mixing is occurring in the eductor tank 26 and the mixed or diluted result is sucked into the solution tank 12.

The time for the fluid operating conditions described above is minimized by storing and exercising a pre-programmed instruction in the electronically controlled hydraulic flow regulator 28 or in the central computer in the cab of the vehicle. Operation of the control valves 38, 40, 56, 64,

80 (three-way), 90, 92, 94, and 114 is fully automatic unless there is a manual over-ride of the stored program in the electronic control devices.

Example features of the first pump 14 (mostly for filling) and second pump 16 (mostly for spraying) include the following. The first pump 14 has higher flow, lower pressure, self priming that is due to a front chamber and open impeller. The second pump 16 is lower flow, higher pressure, and not self priming. The higher pressure is due to a closed impeller so that it generally is not able to prime itself. Even though the second pump 16 pushes lower flow, this is still much more flow than a diaphragm pump can produce. Through the use of the local motors associated with each pump, the two centrifugal pumps can be driven electrically without a hydraulic fluid regulator. Due to the non-self priming characteristics of the second pump 16, it is not used for filling the solution tank 12. However, in some embodiments by adding some aids such as automated software monitoring or manual (human) monitoring, it is also possible to get the second pump 16 started to also fill the solution tank 12—even simultaneously as the first pump 14 is filling the solution tank 12. Another way is to use the spray pump (second pump 16) for filling. But, the centrifugal spray pump (second pump 16) cannot start by itself, so the pump 16 uses an aid in order to get it primed. Other systems prime a pump (e.g. U.S. Pat. No. 7,845,914) but uses a diaphragm pump to prime a centrifugal pump, which involves a two step process to prime the centrifugal pump—either the operator visually checks when priming is done, or extra sensors are installed to detect when the prime is done and switch to filling. On the other hand, in the instant disclosure, using a self-priming pump (e.g. first pump 14) eliminates additional parts for detection and control of the priming since the priming is automatically completed inside the pump.

One alternative embodiment includes using separate pumps for the filling and auto-dilute functions. This alternative adds cost and complexity by requiring three pumps on the sprayer instead of two pumps. This two-pump integrated design reduces extra parts and complications.

In some embodiments of system 10, the filling and spraying circuits are physically separated. This is a way to keep chemicals out of the filling circuit so that the fluid volume to rinse the plumbing drops by 50%, and the ISO 16236 drainable fluid volume drops by 77% as compared to the use of a pump driven by a PTO (power take off) shaft coupled to some power source (e.g. tractor engine).

Example fluid operation system 10 features include improved control, increased fill speed, improved priming, improved pump seal life, less fluid contamination, and lower chemical volume. Each feature is discussed in turn.

Regarding improved control, for older systems having a diaphragm pump run by a PTO shaft, the SCV (selector control valve) would be engaged for the centrifugal pump to operate. For example, the SCV is a hydraulic valve on the vehicle (e.g. tractor) that controls the flow of the tractor's hydraulic oil to the fluid operation system 10. In some embodiments of the fluid operation system 10, both pumps are operated by one control system that gets its power on demand from the vehicle's power (e.g. tractor's engine such as per ISO 17567). As such, the machine operator can start the system 10 from the cab of the vehicle or on a remote farm sight with a single command, rather than first entering the tractor, and then return to the tanks to start the filling process.

Regarding increased fill speed of the solution tank 12, the aforementioned example configurations achieve a filling flow rate of 1100 to 1300 liters/minute, which is the highest filling speed in the trailed sprayer industry presently. With the space savings, the first pump 14 is made larger and has increased power, and the flow tubes connected to the first pump 14 have larger diameter as well, which allow for increased flow rates for filling and dilution. The first (e.g. filling) pump 14 and second pump 16 (e.g. spraying) have high capacity at a manageable cost and weight because they are made of plastic material.

Regarding improved priming, since spray solution filling is performed with a self-priming pump, this relieves the operator of managing the prime, which allows for pressure-sensor-free operation (otherwise, a pressure sensor is typically needed for pump protection and control).

Regarding improved pump seal life, when a filling pump cannot be operated without water, it is known as a "dry" condition, which could cause the seal to overheat and then fail, which in turn generally needs a sensor and alarm to stop such a scenario. With the self priming first pump 14, it is protected from this scenario due to having an internal water chamber such that dry condition protection is always present, mechanically. Consequently, no or fewer monitoring sensors and corresponding software are implemented. Further in some embodiments, the self priming is controlled by sensors that eliminate some failure modes. The sensors detect whether priming has failed or if a dry condition is about to happen or has happened and then alert the operator and/or alert the central controller to take corrective action. Such features have not been considered in the past.

Regarding less chemicals, with fluid isolation, the paths in the filling circuit would not become contaminated after the chemicals are added to the solution. For example, the rinse tank 24 and rinsing circuit themselves remain pure and would not themselves need routine cleansing to ensure that no product is there. Fluid isolation and purity are also important for direct injection systems that may be added the fluid operation system 10.

Embodiments of the fluid operation system 10 include many other advantages such as a fully integrated solution tank 12 with the first pump 14 providing a self-primed filling of the solution tank 12, an automatically controlled recirculation and dilution of the spray solution, a cleaning function for the eductor tank 26 and solution tank 12, all actions of which may occur in a fluid-isolated manner, i.e. free of fluid contamination with the fluid used for spraying the field. In addition, only a minimum number of pumps are used to perform all these functions, which significantly reduces the complexity and maintenance of the fluid operation system 10, in particular with regard to cleaning and rinsing. In particular, for example, the entire filling system is spared of contamination of the chemical applications (spray). This reduces total cleaning effort; filling lines (e.g. 34 and 54) are also equipped with a large tubular cross-section in order to further reduce the filling time for the tank 12, without increasing the cleansing and rinsing effort.

Aside from space reduction (by at least a factor of 2), other advantages of the example embodiments include the following. High speed filling of the solution tank 12: plastic filling pumps have high capacity at a manageable cost. The example plastic fill pump (e.g. 14) is self-priming, which eliminates having priming controls into the system and it eliminates a need for the customer to operate the priming control. The example embodiments include auto-dilute and continuous dilution and larger pumps increases a flow rate for dilution features which reduce the dilution cycle time. Another advantage is integrated public water system or hydrant filling that is compliant with EN1717 European standards to protect the water system from backflow. Some embodiments combine filling with the pump and EN1717 hydrant filling into one filling connection. Filling at the top of the solution tank 12 and using a vacuum break hose maintains EN1717 compliance while using the pump or a public water system. Yet another advantage is the ability to rinse the filling flow circuit after use. Some embodiments allow the fill pump (e.g. 14) to draw clean water from the rinse tank in order to rinse the pump if a pre-mixed chemical load is used. Yet another feature includes clean water for rinsing the eductor tank 26 while the solution tank 12 is being filled. Since the invention uses a centrifugal pump (e.g. for 14), the filling can easily paused, while still providing the clean filling water to the eductor tank 26 and using the spray pump (e.g. 16) to power the eductor tank's venturi connection. Since the filling is paused, the operator has time to mix chemicals in the eductor tank 26. Since the filling speed is increased with these example embodiments, an operator loses very little time with pausing if he does so. Another advantage includes filling pause for the eductor tank 26 use. Filling may be paused at any time for any amount of time while still keeping the clean filling water available for eductor tank 26 rinsing and incorporation.

Finally, the orientation and directions stated and illustrated in this disclosure should not be taken as limiting. Many of the orientations stated in this disclosure and claims are with reference to the direction of travel of the spray vehicle (e.g. rearward is opposite the direction of travel). But, the directions, e.g. "behind" are merely illustrative and do not orient the embodiments absolutely in space. That is, a structure manufactured on its "side" or "bottom" is merely an arbitrary orientation in space that has no absolute direction. Also, in actual usage, for example, the spray equipment may be operated or positioned at an angle because the implements may move in many directions on a hill; and then, "top" is pointing to the "side." Thus, the stated directions in this application may be arbitrary designations.

In the present disclosure, the descriptions and example embodiments should not be viewed as limiting. Rather, there are variations and modifications that may be made without departing from the scope of the appended claims.

What is claimed is:

1. A fluid application system comprising:
 a solution tank that holds a spray solution, wherein the solution tank is flow-coupled to a filling circuit, a circulating circuit, a spraying circuit, and a rinsing circuit;
 a rinse tank that holds rinse solution;
 wherein the filling circuit adds the spray solution to the solution tank, the filling circuit comprising a filling line and a filling valve;
 wherein the circulating circuit agitates the spray solution through the solution tank, the circulating circuit comprising a circulating line and a circulating valve;
 wherein the spraying circuit releases the spray solution from the solution tank, the spraying circuit comprising a spraying line, a spraying valve, and a plurality of spray nozzles;
 wherein the rinsing circuit empties the rinse solution from the rinse tank, the rinsing circuit comprising a rinsing line and a rinsing valve, the rinsing valve fluidically positioned between the filling circuit and the spraying circuit;
 a self-priming pump and a non-self-priming pump;
 wherein the self-priming pump fills the solution tank via the filling circuit from a fluid source and receives rinse solution via the rinsing circuit from the rinse tank;
 wherein the non-self-priming pump operates the circulating circuit, pumps the spray solution from the solution tank for spraying, and receives rinse solution via the rinsing circuit from the rinse tank;
 wherein the non-self-priming pump is located below the tank for the spray solution to flow to the non-self-priming pump by gravity;
 wherein only the filling circuit receives rinse solution directly from the rinse tank when the rinsing valve is in a first position, the filling circuit and spraying circuit each receive rinse solution directly from the rinse tank when the rinsing valve is in a second position, and the spraying circuit receives rinse solution directly from the rinse tank by bypassing the filling circuit and the solution tank when the rinsing valve is in a third position.

2. The fluid application system of claim 1, wherein the self-priming pump and the non-self-priming pump perform different fluid-operation functions that are not performed by said other pump.

3. The fluid application system of claim 1, wherein the fluid application system has only two fluid pumps, the self-priming pump and the non-self-priming pump, and wherein each of the two fluid pumps is configured to perform more than one function among filling, rinsing, diluting, recirculating, and spraying.

4. The fluid application system of claim 1, wherein the self-priming pump and the non-self-priming pump comprise impeller centrifugal pumps that are hydraulically regulated.

5. The fluid application system of claim 1, wherein the pumps are directly electrically or directly wirelessly driven by electronic control signals.

6. The fluid application system of claim 1, wherein when the rinsing valve is in the third position, the non-self-priming pump receives rinse solution from the rinse tank and provides rinse solution to the spraying circuit while the self-priming pump receives spray solution from the fluid source and provides spray solution to the filling circuit to save time.

7. The fluid application system of claim 1, wherein the rinsing circuit includes a dilution operation to dilute the spray solution.

8. The fluid application system of claim 1, wherein the filling circuit is operably paused while a clean fluid is available to an eductor.

9. The fluid application system of claim 8, wherein the application system is mounted on a self-propelled agricultural spray vehicle.

10. The fluid application system of claim 1, wherein the application system is mounted on a self-propelled agricultural spray vehicle.

11. The fluid application system of claim 1, wherein the application system is towed by an agricultural vehicle.

12. The fluid application system of claim 3, wherein the two fluid pumps are configured to simultaneously perform.

13. The fluid application system of claim 1, wherein the rinsing circuit includes an option to continuously dilute or autodilute the spray solution.

14. The fluid application system of claim 1, further comprising a single filling connection at a top of the solution tank, wherein the single filling connection has a vacuum break hose to connect the fluid application system to a public water system.

* * * * *